United States Patent

[11] 3,600,091

| [72] | Inventors | Joseph A. Goleb<br>Naperville;<br>James P. Bobis, Downers Grove; Forrest R. George, Plainfield, all of, Ill. |
|---|---|---|
| [21] | Appl. No. | 36,723 |
| [22] | Filed | May 13, 1970 |
| [45] | Patented | Aug. 17, 1971 |
| [73] | Assignee | The United States of America as represented by the United States Atomic Energy Commission<br>Continuation-in-part of application Ser. No. 639,254, May 12, 1967, now abandoned. |

[54] BRIGHT-LINE EMISSION SOURCE FOR ABSORPTION SPECTROSCOPY
3 Claims, 2 Drawing Figs.

[52] U.S. Cl. ............................................. 356/85, 313/161
[51] Int. Cl. .......................................... G03b 27/04, H01j 1/50

[50] Field of Search ............................................. 356/74, 85, 86, 87; 250/199; 313/161, 225

[56] References Cited
UNITED STATES PATENTS

| 2,847,899 | 8/1958 | Walsh.............................. | 356/85 |
| 3,048,738 | 8/1962 | Paul ............................... | 313/223 X |
| 3,251,997 | 5/1966 | Bell et al........................ | 250/199 |
| 3,319,119 | 5/1967 | Rendina ......................... | 315/248 |
| 3,351,761 | 11/1967 | Hamby et al................... | 250/199 |

Primary Examiner—Ronald L. Wibert
Assistant Examiner—V. P. McGraw
Attorney—Roland A. Anderson

ABSTRACT: An improved light source for atomic absorption spectroscopy consisting of a gas discharge tube containing, as a gas, the element to be analyzed. The gas-filled tube is subjected to high-frequency electromagnetic radiation which excites the atoms of the gas, causing them to emit a constant-intensity light. By subjecting the gas-filled tube to a relatively low-frequency time-varying magnetic field, the light emitted therefrom is intensity or amplitude modulated to the frequency of the field.

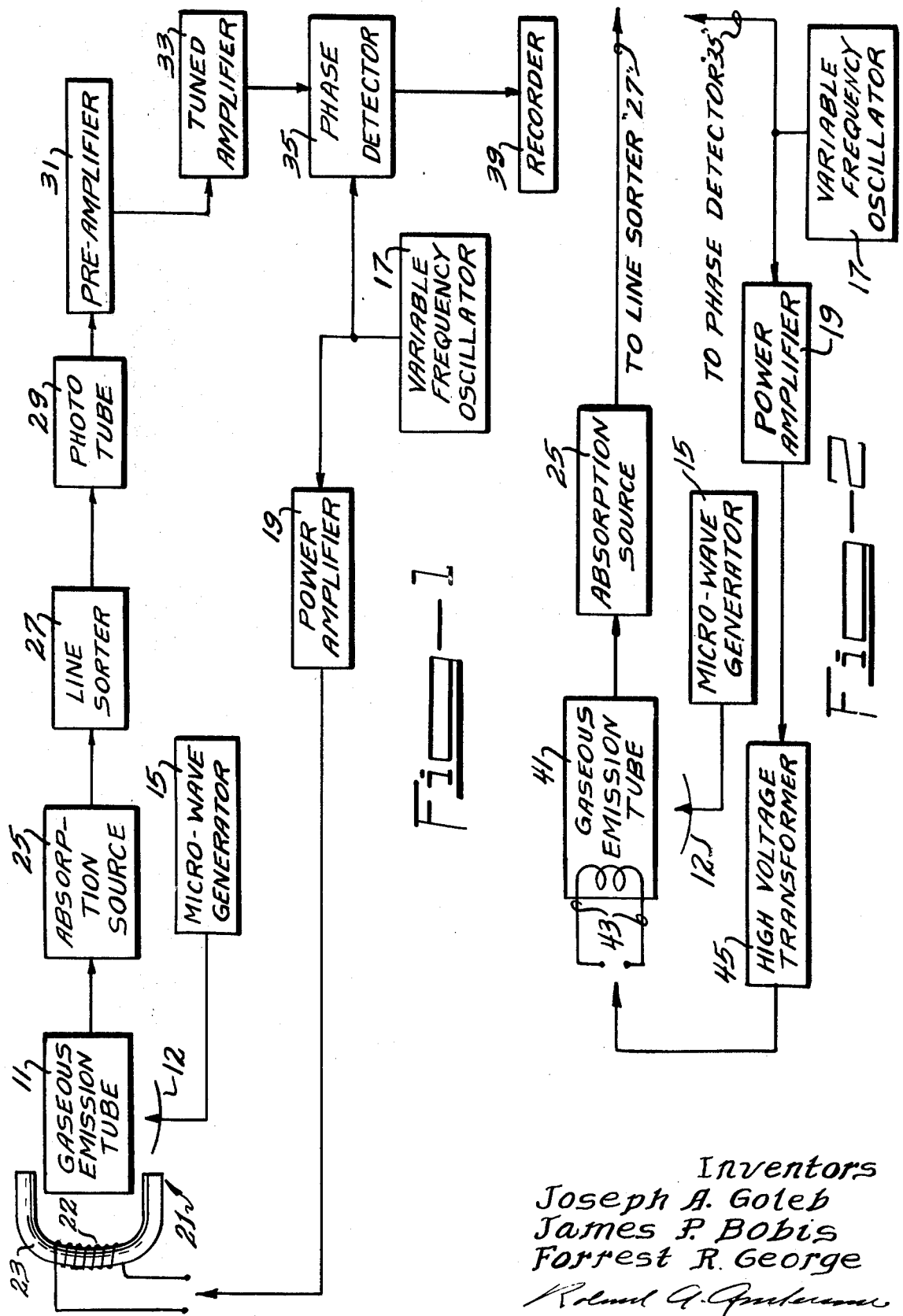

BRIGHT-LINE EMISSION SOURCE FOR ABSORPTION SPECTROSCOPY

This is a continuation-in-part of application Ser. No. 639,254 of Joseph A. Goleb, James P. Bobis, and Forrest R. George, filed May 12, 1967, and now abandoned.

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to a new and improved light emission source for atomic absorption spectroscopy. More specifically this invention relates to a new and improved light emission source which can be intensity or amplitude modulated by electrical means rather than by mechanical apparatus.

Atomic absorption spectroscopy as an analytical tool is receiving increased attention, because relatively simple and inexpensive instrumentation is employed for the determination of an element and/or its isotopes. Atomic absorption is also important in studies of furnace spectra, in investigations of hyperfine structure, and in classifying spectral lines.

Typically an atomic absorption apparatus consists of a light emission source containing a known quantity of a known element or compound. Excitation of atoms of the element within the light source causes light which contains spectral lines characteristic of the elements present and of an intensity proportional to the quantity of the element present. In order that the light source be more easily detectable by appropriate terminal equipment, the light, which is of constant intensity, is modulated, generally by a mechanical chopper which interrupts the light. Between the light emission source and the chopper, a lens is generally used to focus the light through the chopper, a lens is generally used to focus the light through the chopper into an absorption source. The absorption source—which may be either a flame or a hollow-cathode absorption tube—contains the sample to be analyzed quantitatively. The atoms of the sample—the same element found in the light emission source—are dissociated by the flame or by sputtering in the hollow-cathode absorption tube. As the light containing the spectral lines from the emission source passes through the dissociated atoms in the absorption source, photons of light from the emission source strike the atoms, giving up energy to these atoms so that the intensity of the spectral lines is decreased. The spectral lines are decreased in intensity only on striking the same atoms as those creating the lines and in direct proportion to the quantity of these atoms present in the sample. The resulting spectral lines are then compared to known lines to determine the quantity of sample in the absorption source. Equipment for determining line intensity may consist of a line sorter or monochromator to separate out the desired spectral lines, a photocell to detect the spectral line and change the light to a current, and an amplifier tuned to the same frequency as the chopper. After amplification, the voltage is further processed and coupled to a meter or recorder so that the results may be recorded and analyzed.

Heretofore, the most common emission tube is of the hollow-cathode type, where the cathode consists of, or the tube contains, elements the spectrum of which it is required to emit. It is now possible to purchase a number of elements which are available in these tubes and which fulfill many of the requirements for atomic absorption spectroscopy.

The hollow-cathode emission tube has several shortcomings. For instance, although the emission intensity is sufficiently great for most applications and equipment in use at present, new flame sources are increasing in intensity and will require more intense emission sources in order that the signal containing the information may be read through the noise created by the absorption source.

In hollow-cathode emission tubes there is a considerable distance from the hollow cathode which is the excitation source and the window of the tube through which the light generated by the excited atoms is emitted from the tube. As photons from the excited atoms travel the distance from the cathode to the window, they may collide with unexcited atoms in this area. As a result of the collision, the energy of the photon is absorbed by the atom. This reduces the total transmitted light transmitted from the tube, thereby lowering efficiency of the tube as an emission source.

An improved high-intensity hollow-cathode lamp is now available which uses an electric discharge to produce an atomic vapor by cathodic sputtering and the atoms of this vapor are excited in the positive column of a second electric discharge which is electrically isolated from the first discharge. While this presents a vast improvement over the conventional hollow-cathode tube, higher intensity light sources are still needed.

Continuous light sources such as incandescent lamps having strip filaments have been tried in atomic absorption spectroscopy but have been found to be limited in use because of poor sensitivity. Although the lines from an incandescent lamp are intense, it is difficult to discern the absorption of a single line in a number of intense lines.

The flame or absorption source also acts as a source of light and, if both the absorption tube and the emission source have a constant-intensity light output, the readout equipment may be able to discern only light from the emission source. In order that the readout equipment will react only to light from the emission source, some means for changing or modulating the constant-intensity light output to a variable-intensity light source is employed. Then by matching the frequency of the emission source, only light from that source will be recorded by the readout equipment.

This modulation can be accomplished in several different ways. For example, a mechanical cylinder or chopper having opposing slots of varying widths in it and driven by a motor can be placed in front of the emission source. The light from the emission source passes through the cylinder only when the slots are aligned with the light source. The rate at which the light passes is dependent upon the speed of the motor driving the cylinder. Another means for modulating the light consists of one or more vibrating vanes placed in the path of light from the emission source. Thus the frequency of modulation is the same as the frequency of the vibrating vanes or reeds.

All of these mechanical modulation devices have the disadvantage that the frequency at which they operate is limited to operation at a single predetermined frequency which is usually the line frequency of 60 Hz. Operation at this frequency gives rise to noise which is generally generated at 60 Hz. and received by the equipment from power lines. This noise makes it difficult to obtain accurate and consistently acceptable results. While it is possible to vary the speed of the motor and hence the chopper, this has generally proved unsatisfactory due to the narrow range within which the speed can be changed for a given motor. Changing motor speed also results in increased bearing wear and shortened motor life.

Mechanical choppers reduce the amount of available light to go through the absorption tube and activate the phototube, because in mechanically modulating the light, only a portion is allowed to pass through the chopper, the rest of the light from the sources being lost and unavailable for absorption and detection. This results in a relatively poor signal-to-noise ratio.

In an effort to eliminate the mechanical feature of the equipment, workers have tried to operate the hollow cathode with AC current. This has worked to modulate the light emitted by the tube; however, the life of the tube was greatly shortened due to a plating out of the electrode metal on the tube window to make it opaque and render the tube unusable.

Heretofore it has been difficult to use atomic absorption spectroscopy to analyze for gases, and particularly for the noble gases, because the resonance lines of these gases are found in the ultraviolet range, requiring the use of sophisticated and expensive equipment for detection of the spectral lines in this area. An excitation medium which could excite the atoms of these gases to the metastable state would allow the use of conventional readout equipment, because the light from this state is in the visible light spectra which conventional equipment can detect.

SUMMARY OF THE INVENTION

We have invented a light emission source for use in atomic absorption spectroscopy which overcomes the before-mentioned problems. The invention consists of a gas discharge tube containing a known quantity of elements we are seeking to analyze in a gaseous or easily dissociated state. The tube containing the gas is subjected to microwaves which excite the atoms in the tube and cause them to emit a light having characteristic spectral lines for that element which acts as a very intense light source of constant intensity. The light from this source is about 10,000 times brighter than light from a hollow-cathode emission source. By subjecting this tube to an alternating (time varying) electromagnetic field at low voltage and frequency by means of electromagnets placed close to the tube or by electrodes inserted in the tube, it is possible to intensity modulate the light emitted from the gaseous discharge tube by momentarily increasing the intensity of the light. By varying the frequency of the voltage applied to the discharge tube or the electromagnets, it is possible to vary the frequency of modulation of the emitted light. By then matching the response frequency of the readout equipment to the modulation frequency of the light, it is possible to eliminate signals and noise from any other source and read out only the information carried by light from the emission source.

It is therefore an object of this invention to provide an emission source for atomic absorption spectroscopy which has a greater bright line intensity than known light sources.

It is an object of this invention to provide an improved light source for atomic absorption spectroscopy.

Another object of the present invention is to provide an inexpensive means for analyzing elements with atomic absorption spectroscopy.

It is a further object of this invention to provide a light source which is intensity modulated without the use of mechanical devices.

It is another object of this invention to provide a light source which can be intensity modulated without the use of mechanical devices, which has a long life and which does not cause a blackening of the interior surface of the light source envelope.

It is still a further object of this invention to provide a light source which can be intensity modulated without the use of mechanical devices in which it is possible to easily vary the modulation frequency over a wider range than is possible with mechanical devices.

Finally it is an object of this invention to provide a light source for atomic absorption spectroscopy which is relatively inexpensive to obtain and operate.

BRIEF DESCRIPTION OF THE DRAWING

FIG. 1 is a block diagram of one embodiment of the apparatus of our invention.

FIG. 2 is a diagrammatic sketch of a portion of the apparatus of FIG. 1 showing a second embodiment of the invention.

DESCRIPTION OF THE PREFERRED EMBODIMENT

Referring now to FIG. 1, tube 11 is a conventional electrodeless discharge tube containing a known concentration of an element to be analyzed in elemental form or in a compound in a gaseous state at low pressure. Electromagnetic radiation from microwave antenna 12, generated by microwave generator 15, excites the atoms of gas in tube 11 to a high-energy state, whereupon they emit a high-intensity light of constant intensity having bright spectral lines characteristic of the particular element being excited. The output from a variable-frequency oscillator 17 is fed via power amplifier 19 to an electromagnet 21. The electromagnet 21 comprises a coil 22 wound around a horseshoe-shaped core 23 and operates responsive to the output from variable-frequency oscillator 17 to generate an alternating magnetic field about the gaseous emission tube 11 to intensity modulate the light emitted therefrom. The alternating magnetic field acts to excite the already excited atoms to greater energy levels, resulting in momentary increases in the light emitted by the atoms. These momentary increases in light are at the same frequency as the magnetic field. The increase in light intensity results in an enhancement of the incident light over that produced when a mechanical chopper is used. The enhanced incident light produces an output signal having a better signal-to-noise ratio than is possible using a mechanical chopper.

Absorption source 25 is a flame or hollow-cathode absorption tube for dissociating the molecules of the sample, or a quartz cell within which atoms of a sample, which is the same as the element in tube 11, are excited by electromagnetic radiation to an excited state. As the intensity modulated light output from tube 11 passes through absorption source 25, light from the spectral lines of the known element is absorbed by the dissociated or excited atoms of the sample, thereby decreasing the intensity of the spectral lines in the modulated light from tube 11.

The modulated light from tube 11 containing the now partially absorbed spectral lines enters line sorter 27 to eliminate all but one spectral line or line cluster of the element to be analyzed. The line sorter 27 may be either a conventional monochromator or a band-pass filter. The light which passes through line sorter 27 is transmitted to phototube 29 which converts the light to current having an intensity directly proportional to the intensity of the light. After passing through preamplifier 31, the amplified current is fed to tuned amplifier 33 which is tuned to the same frequency as the variable-frequency oscillator 17. Tuned amplifier 33 amplifies only signals at the frequency to which it is tuned, thereby rejecting signals at other frequencies. In this way unmodulated absorber-initiated emission spectra and other extraneous noise present in the system are eliminated.

The output of tuned amplifier 33 is coupled to a phase detector 35, which is of known design. See Radio Engineering Handbook, Henny, Keith, 5th Ed., McGraw-Hill, 1959, pages 12—38 to 12—40 and 12—64. A second input to phase detector 35 is the signal from variable-frequency oscillator 17. The output voltage from phase detector 35 is a function of the phase angle between the signal from variable-frequency oscillator 17. The output voltage from phase detector 35 is a function of the phase angle between the signal from variable-frequency oscillator 17 and the signal from tuned amplifier 33. The component of the signal from tuned amplifier 33 which is the result of the modulation of the gaseous emission tube by electromagnet 21 has the same frequency as the signal from variable-frequency oscillator 17 and thus the phase angle is constant and a DC output signal is developed by the phase detector 35. The remaining components of the signal is developed by the phase detector 35. The remaining components of the signal from tuned amplifier 33 will have frequencies different from the frequency of the signal from variable-frequency oscillator 17 and thus the phase angle will vary periodically to develop AC signals. Phase detector 35 commonly includes a low-pass output filter circuit which passes the DC signals and rejects the AC signals. The DC output signal from phase detector 35 is coupled to recorder 39 to drive the same.

Referring now to FIG. 2, which shows an alternate mode of modulating the light, gaseous emission tube 41 is a quartz gas-discharge tube containing the element to be analyzed in elemental form or in a compound in a gaseous state at low pressure. Two electrodes 43 penetrate the tube 41. Electromagnetic radiation from microwave generator 15 emitted by microwave antenna 12 excites atoms of gas in tube 41 to a high-energy state, whereupon they emit a high-intensity DC light as does gaseous emission tube 11 described in the previous embodiment. The output from variable-frequency oscillator 17 is amplified by power amplifier 19 and then fed to high-voltage transformer 45 before entering tube 41 via electrodes 43 to modulate the light emitted by tube 41. The alternating current from the electrodes imparts additional energy to the atoms in tube 41 which have been excited by the microwave signal, thereby causing the atoms to emit periodically light of still greater intensity in response to the alternating current. The modulated light from tube 41 then enters absorption source 25 as described in embodiment one.

The second embodiment shown in FIG. 2 can also be operated in an alternate way. The output from variable-frequency oscillator 17 which is amplified by power amplifier 19 and fed into high-voltage transformer 45 before entering tube 41 via electrodes 43 will dissociate the atoms of the gas contained in tube 41 in addition to modulating the light emitted therefrom. The dissociated atoms are then excited to a high-energy state by electromagnetic radiation from microwave generator 15 emitted by microwave antenna 12.

The gas emission tube of this invention is a conventional electrodeless gaseous discharge tube familiar to those skilled in the art. Because of the heat associated with the microwave radiation, the envelope should be made of quartz, although, if operating at lower power settings and hence low temperature, glass was found to be satisfactory. Commercial tubes having electrodes, such as Pen-Ray tubes of the Geissler type, were found quite satisfactory.

Any element which is a gas or will form a gaseous compound may be used in the discharge tube and may be analyzed by this apparatus.

EXAMPLE

In operation of the apparatus of this invention, a quartz tube 1 inch long having an internal diameter of ⅛ mm. inch was evacuated and filled with neon gas at a pressure of 1 mm. Hg. For convenience the gas-filled tube was held adjacent to the antenna of a microwave generator whose electromagnetic radiation generated at a frequency of 2450 mhz excited the neon atoms, causing them to emit an intense DC light. Preferably a water-cooled clamp should be used for this purpose. The light output from the tube was modulated by a coil wound about a horseshoe-shaped iron bar to form an electromagnet and placed about an inch from the tube containing the excited atoms. The frequency of the modulation was 150 Hz. and the power input into the electromagnet was about 5 W which produced a magnetic field about the tube of not more than 400 gauss.

An absorber tube was used which contained helium gas at 1 mm Hg pressure to which had been added trace amounts of neon to be analyzed A monochromator was used as a line sorter while the remaining readout equipment was a conventional driving strip recorder. An analytical curve for neon in helium which obeyed Beer's law was established. The accuracy obtained is comparable to that obtained with routine atomic absorption techniques presently employed.

Table I shows the precision obtained when detecting neon in helium using a gaseous discharge tube containing electrodes with the previously described apparatus.

TABLE I

| Tracing No.: | Neon ($1 \times 10^{-9}$ moles) | Deviation from mean |
|---|---|---|
| 1 | 6.00 | +0.24 |
| 2 | 6.00 | +0.24 |
| 3 | 5.80 | +0.04 |
| 4 | 5.80 | +0.04 |
| 5 | 5.80 | +0.04 |
| 6 | 5.65 | −0.11 |
| 7 | 5.65 | −0.11 |
| 8 | 5.65 | −0.11 |
| 9 | 5.65 | −0.11 |
| 10 | 5.65 | −0.11 |
| Mean | 5.76 | |

Std. dev.: ±0.14.
Rel. std. dev.: ±2.4 percent.

Table II shows the precision obtained when detecting neon in helium using an electrodeless gaseous discharge tube with the previously described apparatus.

TABLE II

| Tracing No.: | Neon ($1 \times 10^{-9}$ moles) | Deviation from mean |
|---|---|---|
| 1 | 5.60 | −0.20 |
| 2 | 5.60 | −0.20 |
| 3 | 5.60 | −0.20 |
| 4 | 6.00 | +0.20 |
| 5 | 5.60 | −0.20 |
| 6 | 5.60 | −0.20 |
| 7 | 6.00 | +0.20 |
| 8 | 6.00 | +0.20 |
| 9 | 6.00 | +0.20 |
| 10 | 6.00 | +0.20 |
| Mean | 5.80 | |

Std. dev.: ±0.21
Rel. std. dev.: ±3.6 percent.

Table III shows the precision obtained when detecting neon in helium using a water-cooled hollow-cathode emission tube and a rotating mechanical chopper according to the prior art. Because the light was much less intense than that obtained by the light emission source according to the present invention, a greatly increased slit width in the line sorter was necessary to activate the phototube.

TABLE III

| Tracing No.: | Neon ($1 \times 10^{-9}$ moles) | Deviation from mean |
|---|---|---|
| 1 | 5.70 | 0.06 |
| 2 | 5.70 | 0.06 |
| 3 | 5.70 | 0.06 |
| 4 | 5.70 | 0.06 |
| 5 | 5.70 | 0.06 |
| 6 | 5.50 | 0.14 |
| 7 | 5.70 | 0.06 |
| 8 | 5.50 | 0.14 |
| 9 | 5.50 | 0.14 |
| 10 | 5.70 | 0.06 |
| Mean | 5.64 | |

Std. dev.: ±0.10.
Rel. std. dev.: ±1.8 percent.

Table IV compares the results obtained by use of the three emission sources. It will be noted that the relative error using the prior art apparatus was zero. This, of course, is a statistical oddity. Although the results appear worse according to the present invention, it is believed that optimization of the equipment used would make it possible to obtain results equally accurate. Of course, the error shown is well within acceptable limits and this, as has been said, was obtained using a light source on the order of 10,000 times brighter than those previously used.

In an experiment using the mercury resonance line (2537 A), the incident light using the modulation system of this invention was found to be 80 while the incident light using the mechanical chopper system was found to be 57.

TABLE IV

| Emission source | Major gas | Minor gas Neon | | Std. dev. | Rel. std. dev., percent | Rel. error, percent |
|---|---|---|---|---|---|---|
| | | Moles added | Moles found | | | |
| Gaseous discharge tube containing electrodes | Helium | $5.64 \times 10^{-9}$ | $5.76 \times 10^{-9}$ | ±0.14 | ±2.4 | +2.1 |
| Electrodeless gaseous discharge tube | do | $5.64 \times 10^{-9}$ | $5.80 \times 10^{-9}$ | ±0.21 | ±3.6 | +2.8 |
| Water-cooled hollow-cathode tube | do | $5.64 \times 10^{-9}$ | $5.64 \times 10^{-9}$ | ±0.10 | ±1.8 | 0.0 |

It will be understood that the invention is not to be limited to the details given herein but that it may be modified within the scope of the appended claims.

The embodiments of the invention in which we claim an exclusive property of privilege are defined as follows:

1. An apparatus for atomic absorption spectroscopy, comprising:
   a gas discharge tube containing a known element to be analyzed;
   means for exciting the atoms of said element to cause said atoms to emit light, said emitted light having bright spectral lines characteristic of said element being excited;

means for modulating the intensity of said emitted light at a predetermined frequency including magnetic means positioned at said tube to provide a time varying magnetic field within said tube at said predetermined frequency;

means for containing a sample having an unknown quantity of said element and positioned so that said emitted modulated light is transmitted through said sample; and means for receiving said transmitted light and measuring changes in the intensity thereof to provide a measure of the quantity of said element in said sample.

2. The apparatus according to claim 1 wherein, said means for exciting atoms of said element includes means for generating microwaves and for directing said microwaves into said tube.

3. The apparatus according to claim 1 wherein, said means for modulating the intensity of said emitted light includes an oscillator coupled to said magnetic means and providing a signal at said predetermined frequency, said magnetic means being responsive to said signal to develop said time varying magnetic field at said predetermined frequency, said means for receiving said transmitted light including phase detection means coupled to said oscillator and responsive to said signal to perform phase detection of said transmitted light.